US010540960B1

(12) United States Patent
Jones et al.

(10) Patent No.: US 10,540,960 B1
(45) Date of Patent: Jan. 21, 2020

(54) INTELLIGENT COMMAND FILTERING USING CONES OF AUTHENTICATION IN AN INTERNET OF THINGS (IOT) COMPUTING ENVIRONMENT

(71) Applicant: INTERNATIONAL BUSINESS MACHINES CORPORATION, Armonk, NY (US)

(72) Inventors: Andrew R. Jones, Round Rock, TX (US); Gregory J. Boss, Saginaw, MI (US); Jeremy R. Fox, Georgetown, TX (US); John E. Moore, Jr., Pflugerville, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/122,551

(22) Filed: Sep. 5, 2018

(51) Int. Cl.
| | |
|---|---|
| *G10L 15/07* | (2013.01) |
| *G06N 20/00* | (2019.01) |
| *G06F 3/16* | (2006.01) |
| *G06F 21/32* | (2013.01) |
| *G06N 5/04* | (2006.01) |
| *G10L 17/22* | (2013.01) |
| *G10L 15/22* | (2006.01) |

(52) U.S. Cl.
CPC .............. *G10L 15/07* (2013.01); *G06F 3/167* (2013.01); *G06F 21/32* (2013.01); *G06N 5/046* (2013.01); *G06N 20/00* (2019.01); *G10L 15/22* (2013.01); *G10L 17/22* (2013.01); *G10L 2015/223* (2013.01)

(58) Field of Classification Search
CPC ......... G10L 15/07; G10L 17/22; G10L 15/22; G10L 2015/223; G06N 20/00; G06N 5/046; G06F 3/167; G06F 21/32
USPC ........................................................ 704/246
See application file for complete search history.

(56) References Cited

U.S. PATENT DOCUMENTS

| | | | | |
|---|---|---|---|---|
| 5,828,768 A * | 10/1998 | Eatwell | ................. | G06F 1/1616 381/333 |
| 6,288,740 B1 * | 9/2001 | Lai | ......................... | H04N 7/152 348/14.08 |
| 7,447,635 B1 * | 11/2008 | Konopka | ................ | G10L 15/22 704/231 |
| 8,983,089 B1 * | 3/2015 | Chu | ...................... | H04R 3/005 381/58 |
| 9,098,467 B1 * | 8/2015 | Blanksteen | ............. | G10L 15/22 |
| 9,305,565 B2 * | 4/2016 | Levien | .................... | G10L 21/00 |
| 9,749,583 B1 * | 8/2017 | Fineberg | ................ | H04N 7/147 |
| 9,947,333 B1 * | 4/2018 | David | .................... | G10L 25/51 |
| 2006/0239471 A1 * | 10/2006 | Mao | ...................... | H04R 1/406 381/92 |

(Continued)

OTHER PUBLICATIONS

Van Veen et al., "Beamforming: A Versatile Approach to Spatial Filtering," IEEE ASSP Magazine, Apr. 1988 (21 pages).

*Primary Examiner* — Edwin S Leland, III
(74) *Attorney, Agent, or Firm* — Griffiths & Seaton PLLC

(57) ABSTRACT

Various embodiments are provided for masking unauthorized commands in an Internet of Things (IoT) computing environment by a processor. One or more commands issued to an IoT device may be filtered according to a selected cone of authentication to distinguish between primary users and secondary users to aid in validation of the one or more commands.

14 Claims, 7 Drawing Sheets

(56) References Cited

U.S. PATENT DOCUMENTS

| | | | |
|---|---|---|---|
| 2008/0147763 A1* | 6/2008 | Levin | G06K 9/6242 |
| | | | 708/400 |
| 2015/0006176 A1* | 1/2015 | Pogue | G10L 15/22 |
| | | | 704/249 |
| 2018/0047394 A1* | 2/2018 | Tian | G10L 15/24 |
| 2018/0201226 A1* | 7/2018 | Falkson | B60R 25/257 |
| 2019/0108837 A1* | 4/2019 | Christoph | G06F 3/167 |
| 2019/0156003 A1* | 5/2019 | Alameh | G06F 21/32 |
| 2019/0179594 A1* | 6/2019 | Alameh | G06F 3/16 |
| 2019/0182176 A1* | 6/2019 | Niewczas | H04L 47/803 |

\* cited by examiner

INTELLIGENT COMMAND FILTERING USING CONES OF AUTHENTICATION IN AN INTERNET OF THINGS (IOT) COMPUTING ENVIRONMENT

BACKGROUND OF THE INVENTION

Field of the Invention

The present invention relates in general to computing systems, and more particularly, to various embodiments for intelligent command filtering using cones of authentication to mask unauthorized commands in an Internet of Things (IoT) computing environment using a computing processor.

Description of the Related Art

In today's society, consumers, businesspersons, educators, and others communicate over a wide variety of mediums in real time, across great distances, and many times without boundaries or borders. The advent of computers and networking technologies have made possible the increase in the quality of life while enhancing day-to-day activities and simplifying the sharing of information.

Computing systems can include an Internet of Things (IoT), which is the interconnection of computing devices scattered across the globe using the existing Internet infrastructure. That is, IoT is based on the idea that everyday objects, not just computers and computer networks, can be readable, recognizable, locatable, addressable, and controllable via an IoT communications network (e.g., an ad-hoc system or the Internet). In other words, the IoT can refer to uniquely identifiable devices and their virtual representations in an Internet-like structure. As great strides and advances in technologies come to fruition, these technological advances can be then brought to bear in everyday life.

SUMMARY OF THE INVENTION

Various embodiments are provided for intelligent command filtering using cones of authentication to mask unauthorized commands in an Internet of Things (IoT) computing environment by a processor. One or more commands issued to an IoT device may be filtered according to a selected cone of authentication to distinguish between primary users and secondary users to aid in validation of the one or more commands.

In addition to the foregoing exemplary method embodiment, other exemplary system and computer product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
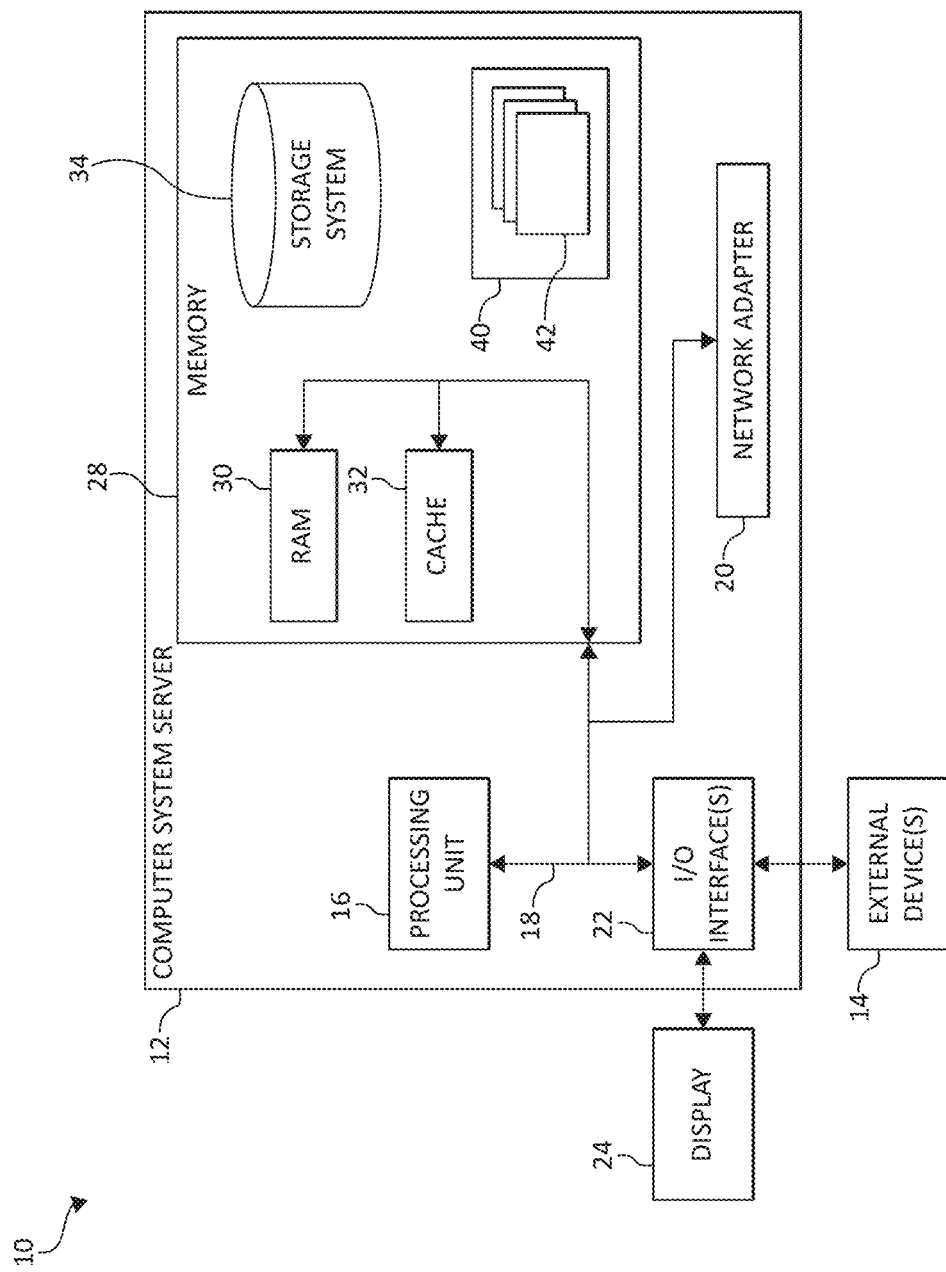
FIG. 1 is a block diagram depicting an exemplary computing node according to an embodiment of the present invention.

Computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances may include computers, smartphones, laptops, voice-activated devices, digital assistants, home appliances, audio systems, televisions, security cameras, security sensors, among countless other examples. Such IoT computing systems may be employed in a variety of settings.

For example, digital assistant usage has dramatically increased over the past few years. Moreover, usage of always-on listening devices (e.g., voice-activated devices) has also increased in homes, buildings, and other types of structures or environments. A current challenge of digital assistants where a significant amount of extraneous noise is present (e.g., a large gathering of people talking to each other in the room with the digital assistant). The extraneous noise, such as background noise, is often a distracting problem causing the digital system difficulty to distinguish between a command for a selected user and other communicated data. This is especially true for a user attempting to issue a voice command to the digital assistant while other persons are communicating near the digital assistant or even simultaneously issuing other voice commands. Accordingly, various embodiments provide a cognitive system that may use cones of authentication to filter and mask unauthorized commands in an Internet of Things (IoT) computing environment.

In one aspect, the present invention provides for a cognitive system that may filter one or more commands issued to an IoT device (e.g., a voice activated hub or "digital assistant") according to a selected cone of authentication to distinguish between primary users and secondary users to aid in validation of the one or more commands. That is, one or more AI (Artificial Intelligence) commands may be filtered by creating variable dynamic angular cones of authorization that can pinpoint audible commands of primary users and differentiate all other angular input data.

In an additional aspect, the cognitive system may identify and distinguish voice command requests for an IoT always-on listening devices (e.g., voice-activated hubs/digital assistants). The cognitive system may prevent an AI listening device (e.g., a digital assistant) from becoming confused due to large amounts of noise within a populated room/environment. The cognitive system may segment each audio input to the AI listening device based upon an array of multiple microphones within a circular pattern (e.g., a 7 microphone array on the AI listening device covering 360 degrees of audio input). The cognitive system may use all available microphones and then may allow for angular discrimination based on audible input direction. Each of the available microphones are utilized because if only one microphone is used the AI listening device is omni directional and is unable to distinguish direction. Also, even though each microphone is picking up the same sound, but at a slight delay in time (e.g., milliseconds) from the other microphones, the direction the of sound is may be determined with high accuracy.

Also, by employing each of the microphones, the AI listening device may create slices (e.g., slice of a region) within a dynamic space. For example, the present invention may dynamically create a 10 degree slice, a 15 degree, or 20 degree, slice of a space. The defined process may enable a cone of variable authorization, which provides increased capabilities for a device to pinpoint and/or identify a primary user and a command request within a noisy/loud environment. Further, the present invention may create both a positive and negative zone of audio horizontal cones. That is, a cone of acceptance (a primary zone with variable authorization) is created around the primary/master user as compared to all other persons within a selected environment (e.g., the negative zone). Thus, the present invention may process privileged commands based on a location of the primary users in relation to the AI listening device (e.g., an IoT listening device).

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition" may be the mental process of knowing, including aspects such as awareness, perception, reasoning and judgment. A machine learning system may use artificial reasoning to interpret data from one or more data sources (e.g., sensor-based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor-based devices or other computing systems that include audio or video devices). Cognitive may also refer to identifying patterns of behavior, leading to a "learning" of one or more events, operations, or processes. Thus, the cognitive model may, over time, develop semantic labels and keywords to apply to observed behavior, authentication levels, commands, and use a knowledge domain or ontology to store the learned observed behavior, authentication levels, and commands. In one embodiment, the system provides for progressive levels of complexity in what may be learned from the one or more events, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems, as described herein, are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security parameters, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
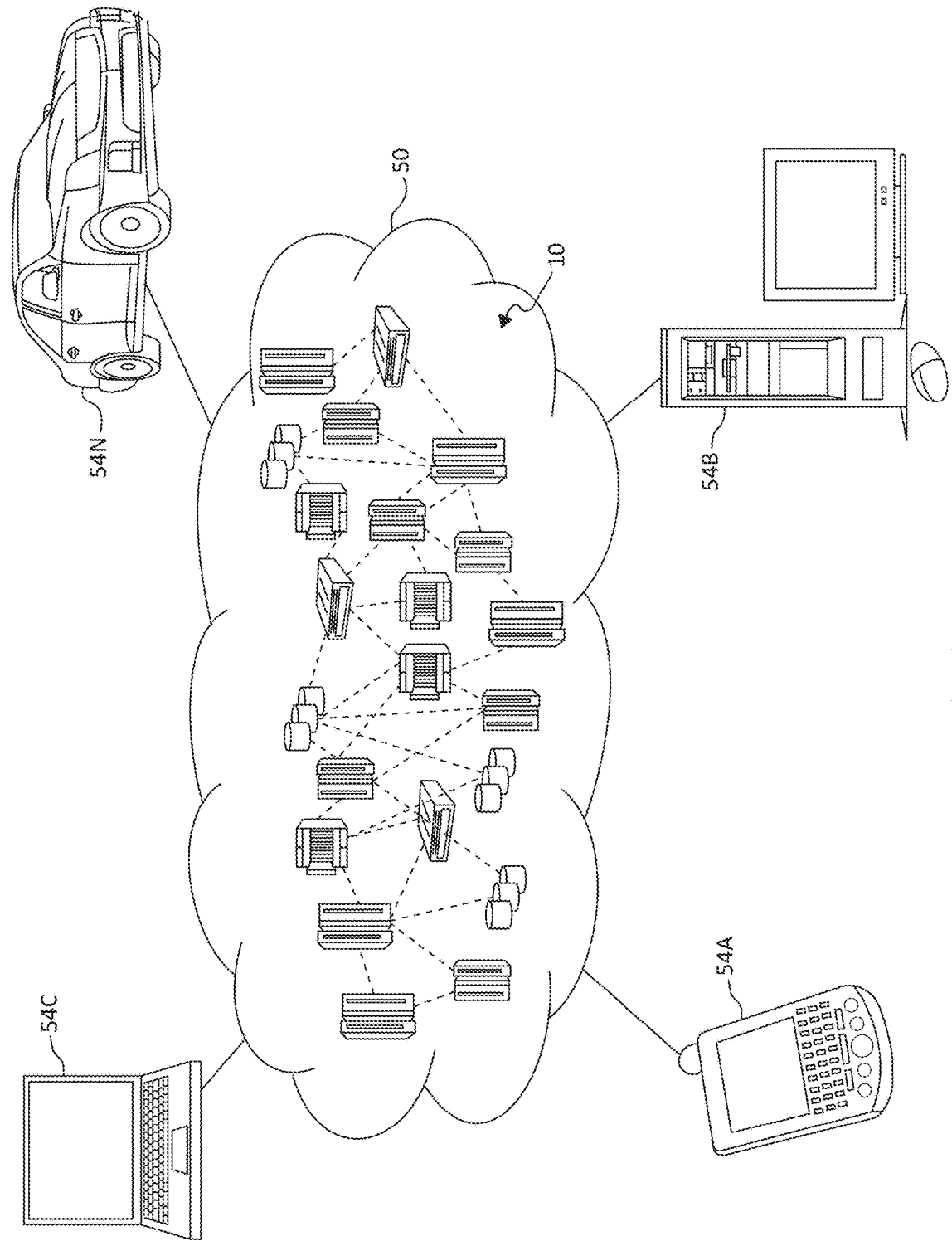
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
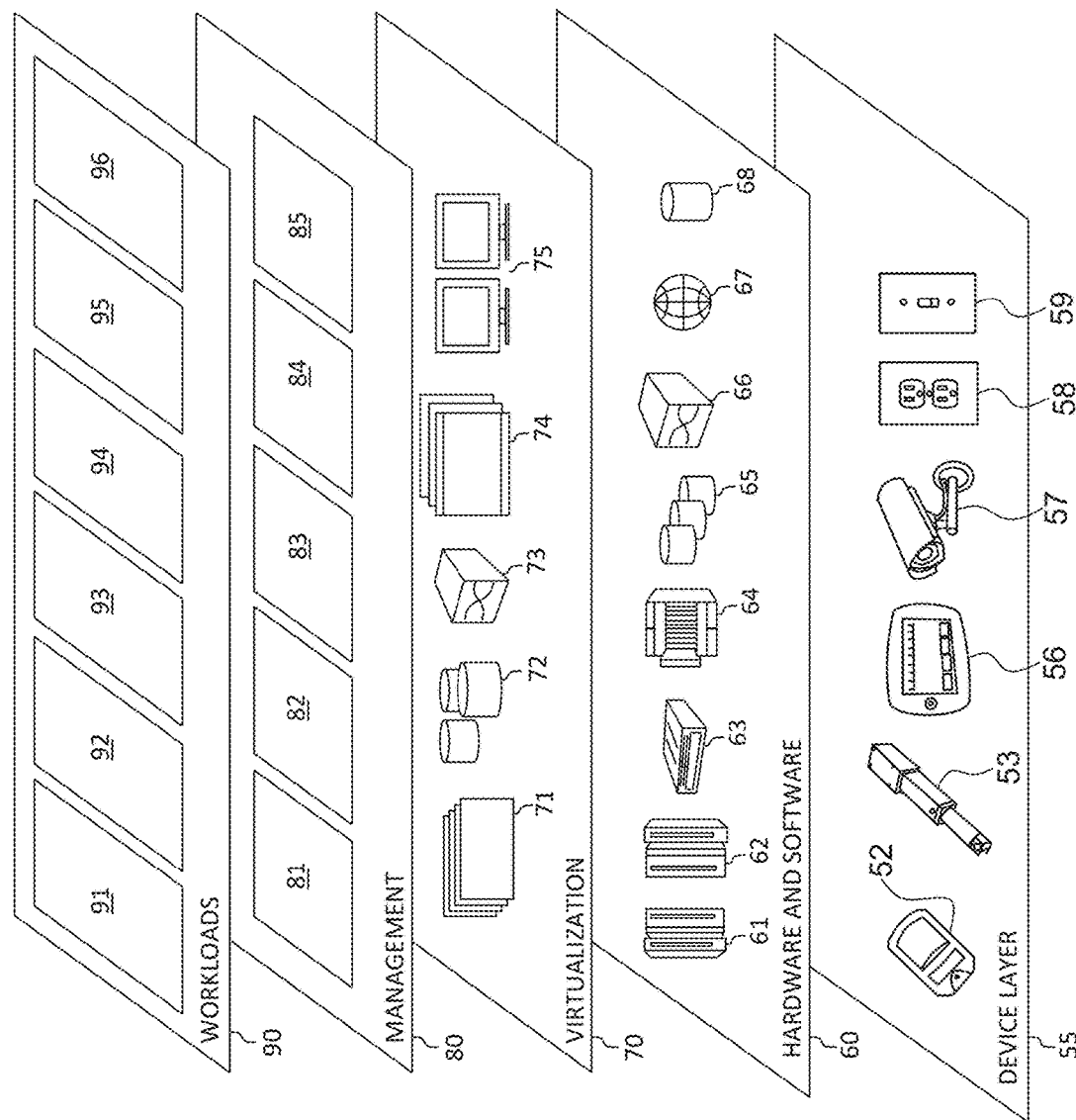
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent command filtering using cones of authentication to mask unauthorized commands. In addition, the workloads and functions 96 for intelligent command filtering using cones of authentication to mask unauthorized commands may include such operations as data analytics, data analysis, and as will be further described, notification functionality. One of ordinary skill in the art will appreciate that the workloads and functions 96 for intelligent command filtering using cones of authentication to mask unauthorized commands may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for a cognitive system that may implement intelligent command filtering using cones of authentication to mask unauthorized commands in an IoT computing environment. That is, spoken AI commands issued by a user may be validated in order to prevent hacking and spoofing by, for example: 1) analyzing a user's digital footprints and physical location in order to determine the eligibility the user to issue an AI command, 2) analyzing the meta-data of a user's digital footprints to establish user intent, and 3) validating an issued command against the users known virtual and physical location and intent.

Figure 4:
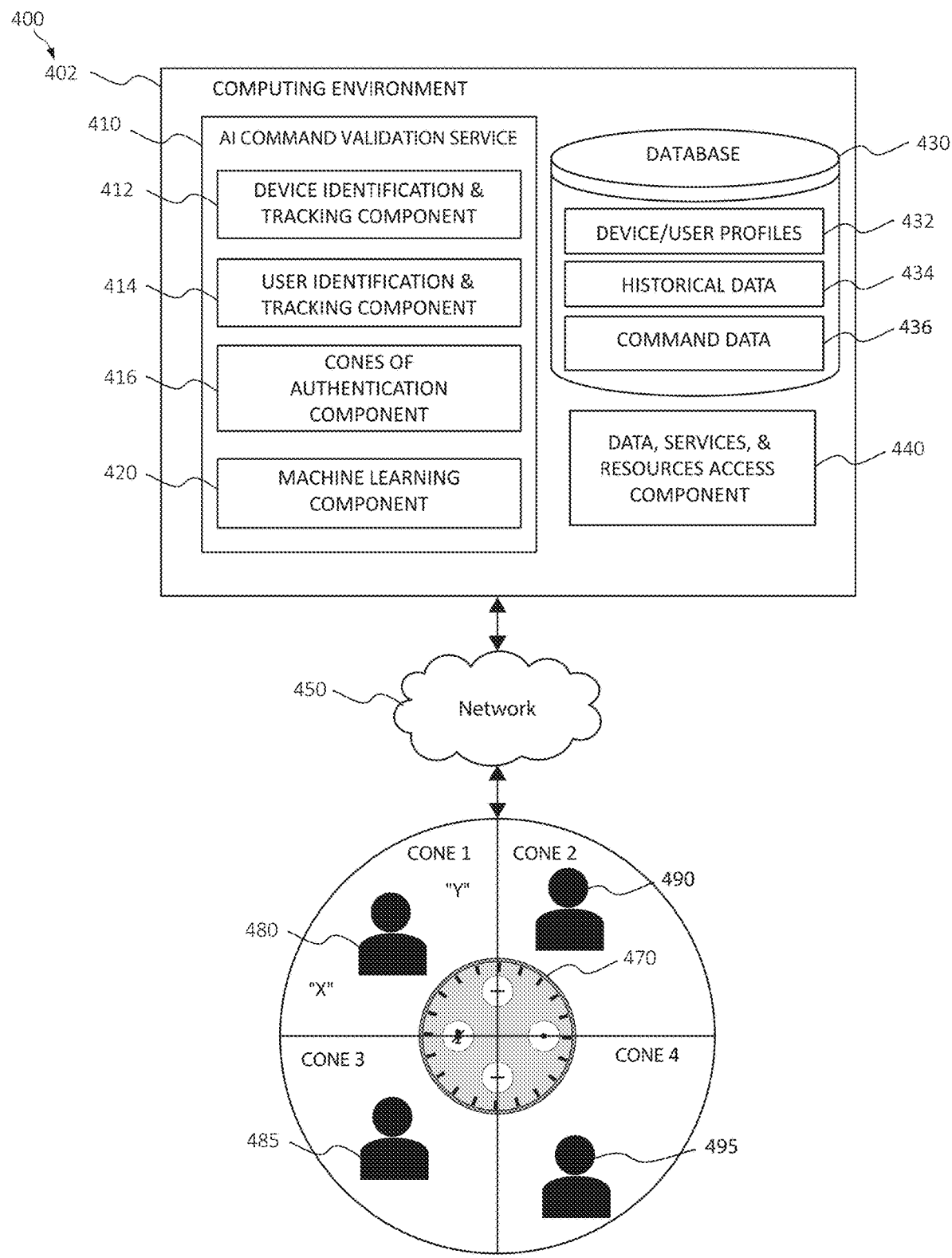
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. FIG. 4 illustrates functional components for intelligent command filtering using cones of authentication to mask unauthorized commands in an IoT computing environment, such as a computing environment 402 (e.g., a "cloud computing environment"). As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for cognitive data curation in accordance with the present invention. Many of the functional blocks 400 may execute as background processes on various components, either in distributed computing components, or on the user device, or elsewhere.

The system 400 may include the computing environment 402, an AI command validation service 410, one or more IoT devices such as, for example, IoT device 470 (e.g., voice activate hub/digital assistant, a desktop computer, laptop computer, tablet, smartphone, and/or another electronic device that may have one or more processors and memory). The IoT device 470, the AI command validation service 410, and the computing environment 402 may each be associated with and/or in communication with each other, by one or more communication methods, such as a computing network 450. In one example, the IoT device 470, the AI command validation service 410, and the computing environment 402 may be controlled by an owner, customer, or technician/administrator associated with the computing environment 402. In another example, the IoT device 470, the AI command validation service 410, and the computing environment 402 may be completely independent from the owner, customer, or user of the computing environment 402.

In one aspect, the computing environment 402 may provide virtualized computing services (i.e., virtualized computing, virtualized storage, virtualized networking, etc.) to the IoT device 470. More specifically, the computing environment 402 may provide virtualized computing, virtualized storage, virtualized networking and other virtualized services that are executing on a hardware substrate.

As depicted in FIG. 4, the computing environment 402 may include the AI command validation service 410, a database 430, and/or a data, services, and resources access component 440. The database 430 may also include device/user profiles 432, historical data 434, and command data 436 for the IoT device 470 and/or the users 480, 485, 490, and/or 495. The database 430 may store, maintain, and update commands that define one or more parameters for accessing data, services, and/or resources internal to and/or external to the computing environment 402. The database 430 may store, maintain, and update device identification and authorization information and/or biometric identification (ID) data associated with the device/user profiles 432, such as, for example, voice data, fingerprint data, facial recognition data, and/or retinal data.

The AI command validation service 410 may provide a device identification and tracking component 412, a user identification (ID) and tracking component 414, a cones of authentication component 416, and/or machine learning component 420.

In one aspect, the data, services, and resources access component 440 may assist in providing access to and/or assist in performing one or more various types of data, services and/or resources (e.g., digital interactions with outside data sources, online services, and/or point of sale ("POS") transaction agreement events). In one aspect, the data, services and/or resources may include, for example, but are not limited to, collecting data content associated with a user, a device or a command, identifying a speaker during a conference call via audio or visual means, calendaring services, scheduling conference calls or meetings, a scheduling assistant, editing, executing a command (e.g., "digital assistant please order product 'X' from company B" or "digital assistant, please order more widgets from company C"), updating calendars and/or phone directories, generating and/or sending e-mails, creating, ordering, scheduling, performing, and/or modifying one or more actions, services, tasks, or services, and so forth. In other words, the one or more data, services, and resources may include data content, services, actions, tasks, or resources that may be predefined, identified, or authorized for the data, services, and resources access component 440 to access, schedule, execute, and/or use.

The IoT devices 470 may communicate with the computing environment 402 via the network 450 (e.g., wireless communication network, etc.) to send a unique device identification (ID) sent from the IoT device 470. That is, the IoT devices 470 may log into the computer environment 402, for the user 480, using various login credentials, which can include a user identification (ID), a unique device ID of the IoT device 470. The unique device ID of the IoT device 470 may be stored, maintained, and/or received in the device identification and tracking component 412 of the AI command validation service 410. The user ID may be stored, maintained, and/or received in the user identification and tracking component 414 of the AI command validation service 410.

The device identification and tracking component 412 may define, establish, and track a physical presence of the one or more users within a defined proximity with the IoT device 470. The device identification and tracking component 412 may define, establish, and track a virtual presence of the one or more users 480 associated with the IoT device 470.

The user ID and tracking component 414 may establish a physical or virtual awareness of user 480. Moreover, the user ID and tracking component 414 may also identify and authorize the users 480, 485, 490, and/or 495 for accessing, using, or executing a command in the computing environment 402 for accessing data/content, services and/or resources provided by the data, services, and resources access component 440. For example, the user 480 may communicate voice commands to the IoT device 470. The computing environment 402, in association with the IoT device 470, may identify the users 480, 485, 490, and/or 495 as the speaker (e.g., "speaker identification" or voice of the issued command. For example, using the embodiments described herein, the computing environment 402 and/or the user ID and tracking component 414 may identify the user 480 speaking when one or more persons connect from each user's own device such as, for example, the IoT device 470. By establishing the authenticated identity, which may include the identification for each user, such as the users 480, 485, 490, and/or 495, the computing environment 402, the user ID and tracking component 414, and/or the IoT device 470 (having the authorized identity) can identity which user issued a voice command.

The cones of authentication component 416 may determine and/or filter one or more commands issued to the IoT device 470 according to a selected cone of authentication to distinguish between primary users and secondary users to aid in validation of the one or more commands. In so doing, the cones of authentication component 416 may define the selected cone of authentication to be included within a plurality of cones of authentication surrounding the IoT device such as, for example, IoT device 470 which may be a voice-activated hub. The selected cone of authentication may be a slice of a three-dimensional ("3D") region surrounding the IoT device 470 (e.g., cone 1, 2, 3, and/or 4). The cones of authentication component 416 may detect a primary user (e.g., user 480) within the selected cone of authentication (e.g., code 1).

In operation, the cones of authentication component 416 may enable listening operations in the selected cone of authentication for receiving the one or more commands issued by a primary user upon detecting the primary user within the selected cone of authentication and/or disable listening operations in each of a plurality alternative cones of authentication upon detecting the primary user within the selected cone of authentication. The cones of authentication component 416 may dynamically increase or decrease (e.g., increase and/or decrease the size/angle of each slice or the selected cone of authentication according to a detected location of a primary user.

The cones of authentication component 416 may: 1) enable the primary user to issue one or more privilege commands in the selected cone of authentication, 2) restrict the secondary users to issuing only non-privileged commands in the selected cone of authentication, and/or 3) restrict an unverified users to issue only non-privileged commands in the selected cone of authentication.

The cones of authentication component 416, in association with the device identification and tracking component 412 and the user identification and tracking component 414, may identify both the location of the user and the IoT device 470 and analyze a physical distance between a current location of the user (e.g., user 480) and the IoT device 470 within one of the cones of authentication.

The machine learning component 420 may include machine learning operation functionality to perform one or more AI operations and/or natural language processing ("NLP") operations. The machine learning operations may include one or more AI or NLP instances. These instances may include, for example, IBM® Watson® such as Watson® Analytics. (IBM® and Watson® are trademarks of International Business Machines Corporation).

In view of the foregoing components and functionality of FIG. 4, consider the following operational steps.

In step 1, the IoT device 470 may actively listen and identify for one or more commands from user 480 (e.g., user 480 in cone 1). If a wake word (e.g., a word or phrase to activate the IoT device 470) is detected/heard, the IoT device 470 may continue with a command request (e.g., a command request from user 480 in cone 1). If the wake word is not detected, the IoT device 470 remains in the listening mode and is not activated.

In step 2, the AI command validation service 410 may identify that the user 480 communicated the wake word. The AI command validation service 410 may determine a direction and source of the sound, and the identified location of the sound may be mapped based on a dynamic angular mathematical operation. The AI command validation service 410 may search for one or more known authorized users (e.g., user 480) and ping any devices (smart phone, smart watch, laptops, Bluetooth® headsets, etc.) associated with the known authorized user (e.g., user 480 in cone 1) by one or more triangulation operations (e.g., Bluetooth®, Wi-Fi, etc.). A personal device of a known user (not shown for illustrative convenience) and the IoT device 470 (e.g., voice activated hub) can be established upon system setup and initiation. Also, an additional level of authentication may be performed such as, for example, using voice recognition to add another element of trust between the user 480 and IoT device 470.

In step 3, the AI command validation service 410 may verify a location of a primary and/or secondary user (e.g., primary user 480 in cone 1 and/or secondary user 485 in cone 3). That is, the AI command validation service 410 may verify that the communicated wake word was spoken by a primary user (e.g., user 480 in cone 1). The location of the primary user that audibly communicated the wake word may be recorded and stored.

In step 4, the AI command validation service 410 may create a cone of variable authorization for the identified location. Once the user's location has been verified, the AI command validation service 410 may create a directional cone authorization. If the location of user is associated with a primary user (e.g., a master authorized user), the AI command validation service 410 may validate a user within the cone of variable authentication and may allow access and use of IoT device 470 for communicating any privileged commands. Alternatively, if the location of user is not associated with the master authorized user (e.g., a secondary user), the AI command validation service 410 may validate the user with the cone of variable authentication as a secondary user and may prevent/restrict the user from issuing any privileged commands and only allow the secondary user to issue non-privileged commands (e.g., secondary user 485 in cone 3 is only authorized to issue non-privileged commands).

It should be noted that privileged and non-privileged commands may also be defined, learned, and/or created by the AI command validation service 410. For example, a privileged command may enable a primary user to order goods and services (e.g., user 480 in cone 1 may order goods and services via the data, services, and resources access component 440). A non-privileged command may be a command that is restricted from ordering goods/service, but rather be defined as a query relating to request for general/public information such as, for example, a query related to time, weather, or geographical data such as, for example, "what time is it?," or "will it rain tomorrow?"

In step 5, the AI command validation service 410 may simultaneously manage multiple cones of authentication (e.g., cones of authentication). That is, one or more users may be within different cones of authentication and the AI command validation service 410 may manage and control each particular cone of variable authentication.

For example, assume there are at least four cones of authentication (e.g., cones 1, 2, 3, and 4) in a single room. Cone 1 may be surround user 480 and allow user 480 to do anything as a primary/master user. Cone 2 may surround user 490 and only allows informational non-privileged commands items by user 490. Cone 3 may surround user 485 and cone 3 is tracking and following user 485 as user 485 is talking and walking past user 480 in the room. User 485 is only allowed non-privileged commands. Cone 4 may be established as user 495 walks into the room and is determined to be an unverified user (e.g., a new user). In this case, user 495 is only allowed non-privileged commands.

In step 6, the AI command validation service 410 may manage a degree of definition for each of the created cones of authentication. In one aspect, the cones of authentication can be defaulted to a defined degree (e.g., a 45 degree) to start. The cones of authentication may dynamically and quickly increase and/or decrease their degrees of authorization zones based on the acquisition of the primary/master user's location.

As the primary user starts closer to the device (e.g., within a defined distance) the degrees of definition can be larger. However, as the user walks further away from the listening device, the degrees of definition may be lowered/decreased to provide pinpoint accuracy as the distance from the device increases. For example, assume user 480 starts at least two feet away from IoT device 470 with a 45 degree slice as a cone of variable authentication (e.g., cone 1 is a 45 degree slice of a 360 degree of unit circle for listening by the IoT device 470). As user 480 walks away from the IoT device 470 to at least a distance of ten feet, the 45 degree slice may be reduced to 10 degrees for the purpose of achieving higher accuracy to engage the user.

In an additional aspect, the AI command validation service 410 may enable the cone of variable authentication to be static and only allow certain classes of commands in that particular static, cone of variable authentication (e.g., IoT device 470 is set up to only allow user 480 to order products if standing in location X or Y of cone 1). In this way, only an authorized user (e.g., user 480) may be privy to the requirement of being in a particular location for issuing privileged commands, which may also serve as a form of authentication. In an additional aspect, the AI command validation service 410 may set the cone to be between 40 degrees and 60 degree and at least 5 feet off the floor (vertical) thereby creating a natural filter for smaller children preventing the minor child from order items (e.g., issuing commands) because they less than the height of the IoT device 470.

Figure 5:
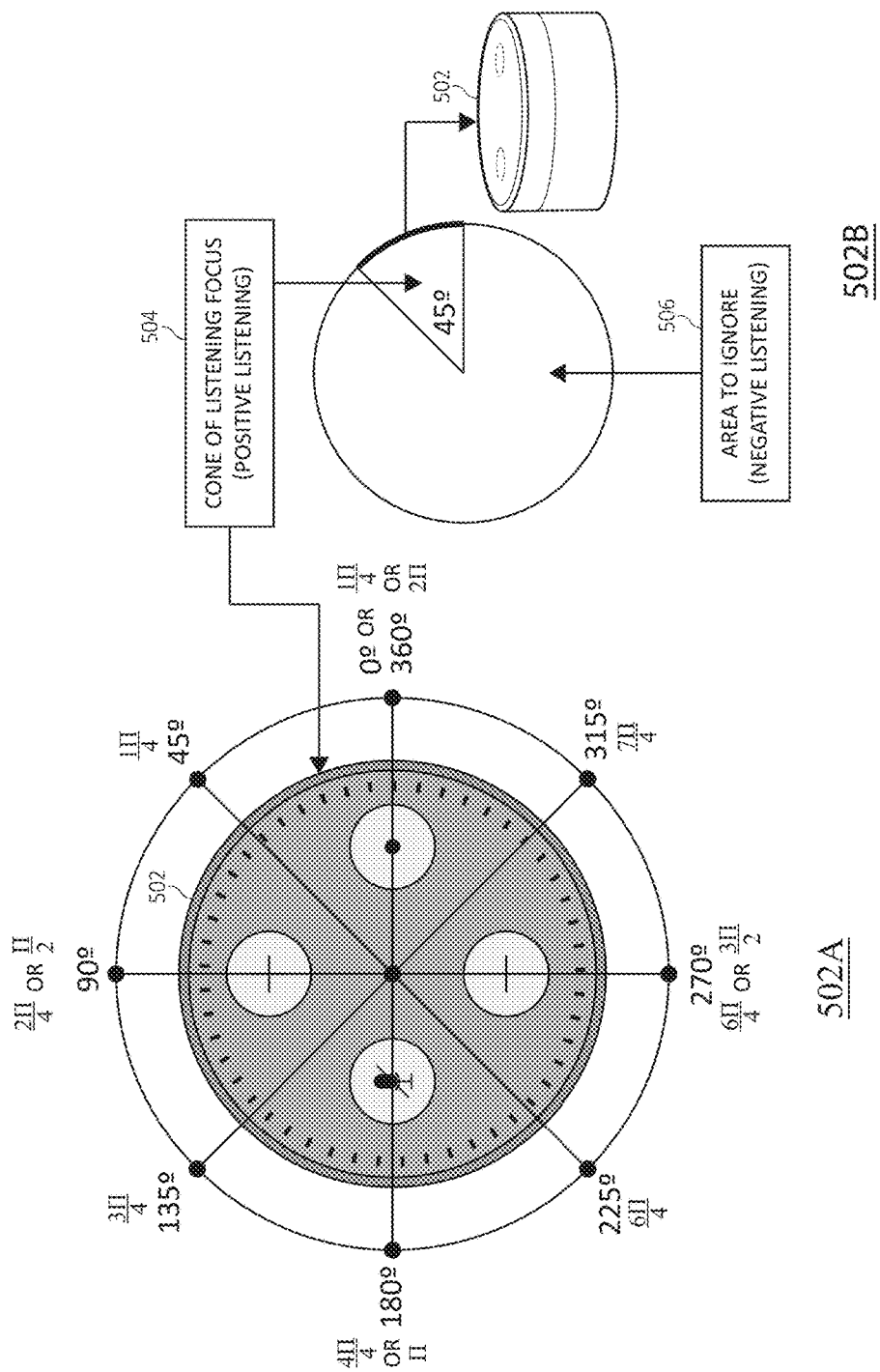
FIG. 5 is a diagram of positive listening and negative listening in cones of authentication in accordance with an embodiment of the present invention.

Turning now to FIG. 5, diagram 500 depicts positive listening and negative listening in cones of authentication. That is, an IoT device 502 (e.g., a voice activated hub/digital assistant) is depicted. The IoT device 502 may have multiple microphones (not shown for illustrative convenience) installed thereon for creating cones of authentication, which may be defined slice or degree of a unit circle in relation to the IoT device 502. Thus, diagram 500 depicts various views of the cones of authentication (e.g., as illustrated in views 502A and 502B of the IoT device 502). It should be noted that the cones of authentication may be a 3D area or spherical in nature. For example, assume a primary user is in a building that that has 2 floor and the user moves between each floor. The user may still be in the same cone of authentication even though the primary user may climb up/down a flight of stairs from the first floor to the second floor or vice versa if the flight of stairs is within the same cone of authentication.

In one aspect, IoT device 502 may create one or more cones of authentication in 45 degree slices of a 360 degree area of a unit circle of the IoT device 502, as illustrated in view 502A and 502B. In one aspect, one or more cones of authentication may be activated or determined to be a positive listening zones of a cone of authentication (e.g., positive listening zone 504) while all other cones of authentication are designated as negative listening cones of authentication (e.g., negative listening zone 506), as illustrated in view 502B.

Figure 6:
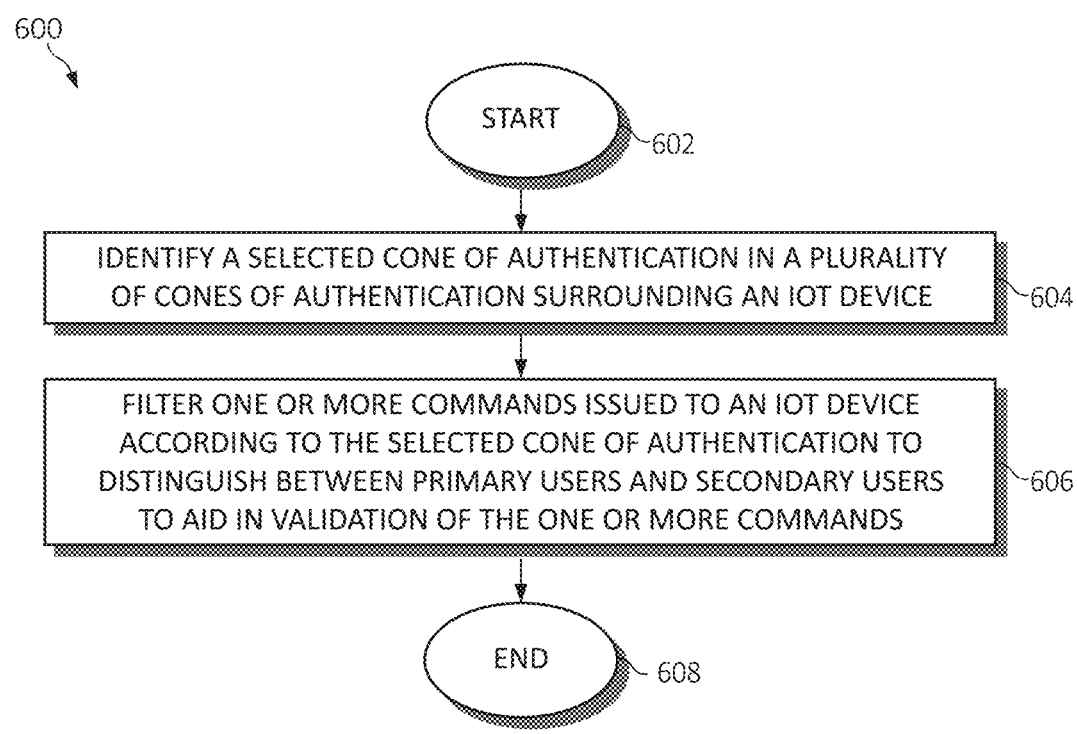
FIG. 6 is a flowchart diagram depicting an exemplary method for intelligent command filtering using cones of authentication in an Internet of Things (IoT) computing environment in accordance with an embodiment of the present invention.

Turning now to FIG. 6, a method 600 is illustrated for intelligent command filtering using cones of authentication in an Internet of Things (IoT) computing environment, in which various aspects of the illustrated embodiments may be implemented. The functionality 600 may be implemented as a method executed as instructions on a machine, where the instructions are included on at least one computer readable medium or on a non-transitory machine-readable storage medium.

The functionality 600 may start in block 602. A selected cone of authentication in a plurality of cones of authentication surrounding an IoT device (e.g., a voice activated hub) may be identified, as in block 604. One or more commands issued to an IoT device may be filtered according to the selected cone of authentication to distinguish between primary users and secondary users to aid in validation of the one or more commands, as in block 606. The functionality 600 may end in block 608.

Figure 7:
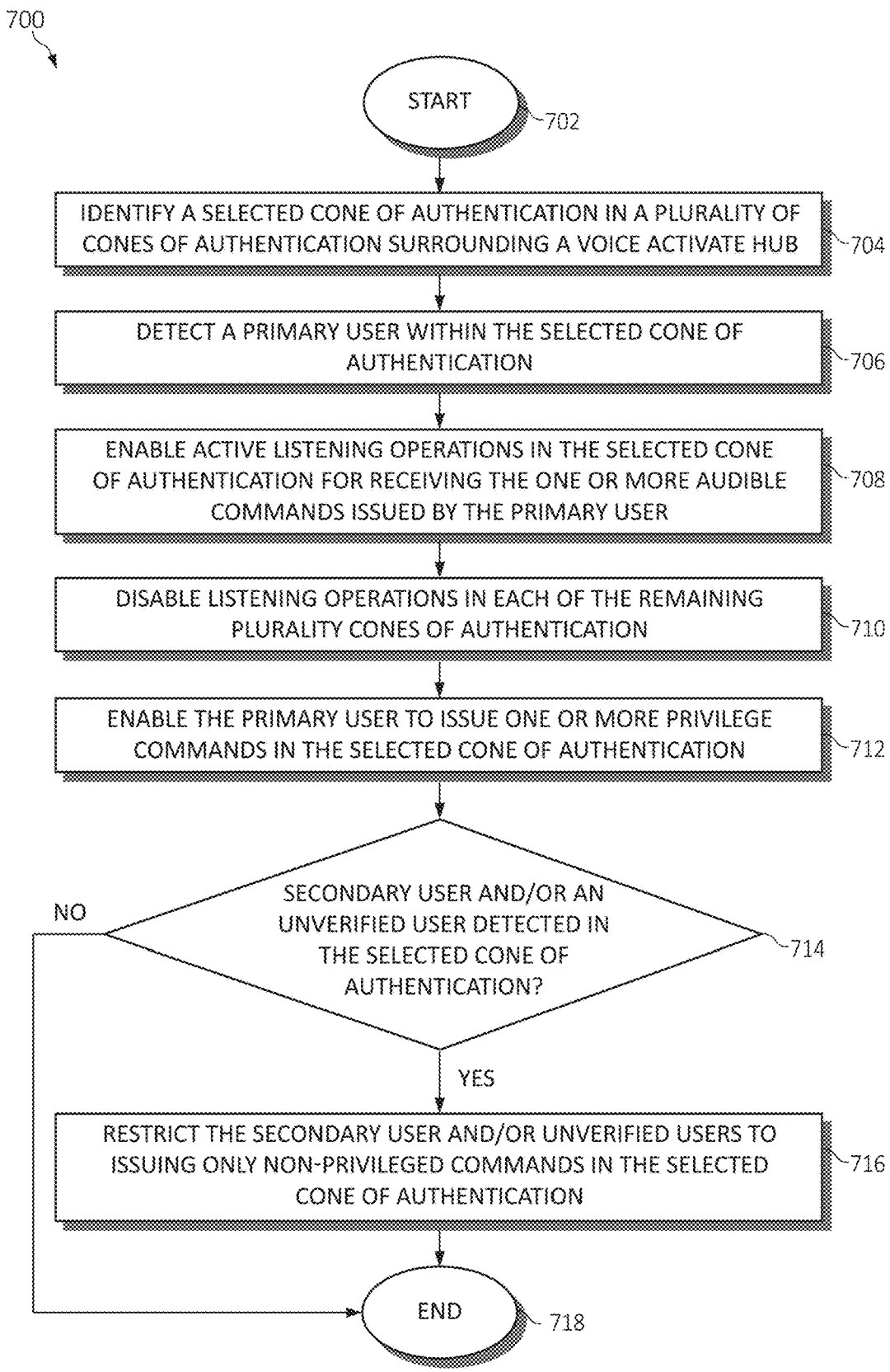
FIG. 7 is a flowchart diagram depicting an additional exemplary method for intelligent command filtering using cones of authentication in an Internet of Things (IoT) computing environment with in accordance with an embodiment of the present invention.

Turning now to FIG. 7, an additional method 700 is illustrated for intelligent command filtering using cones of authentication in an Internet of Things (IoT) computing environment, in which various aspects of the illustrated embodiments may be implemented. The functionality 700 may be implemented as a method executed as instructions on a machine, where the instructions are included on at least one computer readable medium or on a non-transitory machine-readable storage medium. The functionality 700 may start in block 702.

A selected cone of authentication in a plurality of cones of authentication surrounding an IoT device (e.g., a voice activated hub) may be identified, as in block 704.

A primary user may be detected within the selected cone of authentication, as in block 706. Active listening operations may be enabled in the selected cone of authentication for receiving the one or more audible commands issued by the primary user, as in block 708. Listening operations in each of the remaining plurality cones of authentication may be disabled, as in block 710.

The primary user is enabled to issue one or more privilege commands in the selected cone of authentication, as in block 712. Said differently, all commands (including privileged and non-privileged commands) issued by the primary user may be verified and authenticated within the selected cone of authentication.

A determination operation may be performed to detect/determine if a secondary user and/or an unverified user are detected in the selected cone of authentication, as in decision step 714. If no at block 714, the method 700 may move to block 718. If a secondary user and/or an unverified user are detected in the selected cone of authentication at block 714, the secondary user and/or the unverified user may be restricted to issuing only non-privileged commands in the selected cone of authentication, as in block 716. Said differently, only non-privileged commands issued by the secondary user and/or the unverified user may be verified and authenticated within the selected cone of authentication. The functionality 700 may end in block 718.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

What is claimed is:

1. A method, by a processor, for masking unauthorized commands in an Internet of Things (IoT) computing environment, comprising:
    filtering one or more commands issued to an IoT device according to a selected cone of authentication to distinguish between primary users and secondary users to aid in validation of the one or more commands; wherein the selected cone of authentication has an opening angle of a defined degree; and
    increasing the degree of the opening angle of the selected cone of authentication in response to detecting that a primary user is moving closer to the IoT device, and decreasing the degree of the opening angle in response to detecting that the primary user is moving farther from the IoT device.

2. The method of claim 1, further including defining the selected cone of authentication to be included within a plurality of cones of authentication surrounding the IoT device, wherein the IoT device is a voice-activated hub.

3. The method of claim 1, further including defining the selected cone of authentication as a slice of a three-dimensional ("3D") region surrounding the IoT device.

4. The method of claim 1, further including:
    enabling listening operations in the selected cone of authentication for receiving the one or more commands issued by the primary user upon detecting the primary user within the selected cone of authentication; and
    disabling listening operations in each of a plurality alternative cones of authentication upon detecting the primary user within the selected cone of authentication.

5. The method of claim 1, further including:
    enabling the primary user to issue one or more privilege commands in the selected cone of authentication;
    restricting the secondary users to issuing only non-privileged commands in the selected cone of authentication; or
    restricting an unverified users to issue only non-privileged commands in the selected cone of authentication.

6. A system, for masking unauthorized commands in an Internet of Things (IoT) computing environment, comprising:
    one or more processors with executable instructions that when executed cause the system to:
        filter one or more commands issued to an IoT device according to a selected cone of authentication to distinguish between primary users and secondary users to aid in validation of the one or more commands; wherein the selected cone of authentication has an opening angle of a defined degree; and
        increase the degree of the opening angle of the selected cone of authentication in response to detecting that a primary user is moving closer to the IoT device, and decrease the degree of the opening angle in response to detecting that the primary user is moving farther from the IoT device.

7. The system of claim 6, wherein the executable instructions further define the selected cone of authentication to be included within a plurality of cones of authentication surrounding the IoT device, wherein the IoT device is a voice-activated hub.

8. The system of claim 6, wherein the executable instructions further define the selected cone of authentication as a slice of a three-dimensional ("3D") region surrounding the IoT device.

9. The system of claim 6, wherein the executable instructions further:
    enable listening operations in the selected cone of authentication for receiving the one or more commands issued by the primary user upon detecting the primary user within the selected cone of authentication; and
    disable listening operations in each of a plurality alternative cones of authentication upon detecting the primary user within the selected cone of authentication.

10. The system of claim 6, wherein the executable instructions further:
    enable the primary user to issue one or more privilege commands in the selected cone of authentication;
    restrict the secondary users to issuing only non-privileged commands in the selected cone of authentication; or
    restrict an unverified users to issue only non-privileged commands in the selected cone of authentication.

11. A computer program product for masking unauthorized commands in an Internet of Things (IoT) computing environment by one or more processors, the computer program product comprising a non-transitory computer-readable storage medium having computer-readable program code portions stored therein, the computer-readable program code portions comprising:
    an executable portion that filters one or more commands issued to an IoT device according to a selected cone of authentication to distinguish between primary users and secondary users to aid in validation of the one or more commands; wherein the selected cone of authentication has an opening angle of a defined degree; and
    an executable portion that increases the degree of the opening angle of the selected cone of authentication in response to detecting that a primary user is moving closer to the IoT device, and decreases the degree of the opening angle in response to detecting that the primary user is moving farther from the IoT device.

12. The computer program product of claim 11, further including an executable portion that:
- defines the selected cone of authentication to be included within a plurality of cones of authentication surrounding the IoT device, wherein the IoT device is a voice-activated hub; or
- defines the selected cone of authentication as a slice of a three-dimensional ("3D") region surrounding the IoT device.

13. The computer program product of claim 11, further including an executable portion that:
- enables listening operations in the selected cone of authentication for receiving the one or more commands issued by the primary user upon detecting the primary user within the selected cone of authentication; and
- disables listening operations in each of a plurality alternative cones of authentication upon detecting the primary user within the selected cone of authentication.

14. The computer program product of claim 11, further including an executable portion that:
- enables the primary user to issue one or more privilege commands in the selected cone of authentication;
- restricts the secondary users to issuing only non-privileged commands in the selected cone of authentication; or
- restricts an unverified users to issue only non-privileged commands in the selected cone of authentication.

* * * * *